United States Patent
Nordbruch

(10) Patent No.: US 10,395,563 B2
(45) Date of Patent: Aug. 27, 2019

(54) METHOD AND APPARATUS FOR EDITING A DIGITAL MAP OF A TRANSPORT VEHICLE FOR TRANSPORTING VEHICLES

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 15/531,035

(22) PCT Filed: Sep. 29, 2015

(86) PCT No.: PCT/EP2015/072415
§ 371 (c)(1),
(2) Date: May 26, 2017

(87) PCT Pub. No.: WO2016/082993
PCT Pub. Date: Jun. 2, 2016

(65) Prior Publication Data
US 2018/0012519 A1    Jan. 11, 2018

(30) Foreign Application Priority Data
Nov. 26, 2014  (DE) .................. 10 2014 224 096

(51) Int. Cl.
*G09B 29/10* (2006.01)
*G01C 21/32* (2006.01)
(Continued)

(52) U.S. Cl.
CPC ........... *G09B 29/106* (2013.01); *G01C 21/20* (2013.01); *G01C 21/32* (2013.01);
(Continued)

(58) Field of Classification Search
CPC .... G09B 29/106; G08G 1/168; G05D 1/0212; G01C 21/20; G01C 21/3667; B60P 3/06; G06Q 50/28
See application file for complete search history.

(56) References Cited

U.S. PATENT DOCUMENTS

| | | | |
|---|---|---|---|
| 7,107,286 B2 * | 9/2006 | Burnett | ............... G01S 19/01 |
| 2007/0118283 A1 * | 5/2007 | Jendbro | ............... G01C 21/20 |
| | | | 701/469 |

(Continued)

FOREIGN PATENT DOCUMENTS

| DE | 102009029117 A1 | 3/2011 |
|---|---|---|
| DE | 102012016800 A1 | 2/2014 |

(Continued)

OTHER PUBLICATIONS

International Search Report dated Feb. 12, 2016 of the corresponding International Application PCT/EP2015/072415 filed Sep. 29, 2015.

(Continued)

*Primary Examiner* — Yonel Beaulieu
*Assistant Examiner* — Martin A Weeks
(74) *Attorney, Agent, or Firm* — Norton Rose Fulbright US LLP; Gerard Messina

(57) ABSTRACT

A digital map of a transport vehicle for transporting vehicles includes one or more digital reference locations that are respectively associated with real reference locations of the transport vehicle. A method includes: ascertaining respective reference coordinates of the real reference locations relative to a reference coordinate system, so that the ascertained reference coordinates are associated with the corresponding digital reference locations; deriving respective coordinates of further digital locations of the digital map from the reference coordinates of the reference locations based on a derivation protocol, so that coordinates relative to the ref- (Continued)

erence coordinate system are respectively associated with the further digital locations, so that an edited digital map of the transport vehicle is created, in which map coordinates relative to the reference coordinate system are associated with the digital locations.

12 Claims, 3 Drawing Sheets

(51) Int. Cl.
    *G06Q 10/08* (2012.01)
    *G01C 21/20* (2006.01)
    *G05D 1/02* (2006.01)
    *G08G 1/16* (2006.01)
    *B60P 3/06* (2006.01)
    *G06Q 50/28* (2012.01)
    *G01C 21/36* (2006.01)

(52) U.S. Cl.
    CPC ....... *G01C 21/3667* (2013.01); *G05D 1/0212* (2013.01); *G06Q 10/08* (2013.01); *G08G 1/168* (2013.01); *B60P 3/06* (2013.01); *G06Q 50/28* (2013.01)

(56) References Cited

U.S. PATENT DOCUMENTS

| | | | |
|---|---|---|---|
| 2010/0110412 A1* | 5/2010 | Basu | G01C 15/002 356/3 |
| 2011/0181615 A1* | 7/2011 | Saarinen | G01C 21/00 345/619 |
| 2013/0013201 A1* | 1/2013 | Soucy | G01C 21/20 701/520 |

FOREIGN PATENT DOCUMENTS

| | | |
|---|---|---|
| DE | 102014007794 A1 | 10/2014 |
| JP | S641875 A | 1/1989 |
| JP | 2005181213 A | 7/2005 |

OTHER PUBLICATIONS

Kummerle R., et al., "Autonomous driving in a multi-level parking structure," 2009 IEEE International Conference on Robotics and Automation (ICRA), Kobe, Japan, May 12-17, 2009, IEEE, Piscataway, NJ, USA, May 12, 2009, pp. 3395-3400.

* cited by examiner

METHOD AND APPARATUS FOR EDITING A DIGITAL MAP OF A TRANSPORT VEHICLE FOR TRANSPORTING VEHICLES

CROSS-REFERENCE TO RELATED APPLICATIONS

The present application is the national stage of International Pat. App. No. PCT/EP2015/072415 filed Sep. 29, 2015, and claims priority under 35 U.S.C. § 119 to DE 10 2014 224 096.4, filed in the Federal Republic of Germany on Nov. 26, 2014, the content of each of which is incorporated herein by reference in its entirety.

FIELD OF THE INVENTION

The present invention relates to a method and an apparatus for creating and/or editing a digital map of a transport vehicle for transporting vehicles. The method furthermore relates to a loading system for loading vehicles, and to a computer program.

BACKGROUND

Published Application DE 10 2012 016 800 A1 presents a method and an apparatus for ascertaining a vehicle position in a mapped environment.

Published Application 10 2012 222 562 A1 presents a system for managed parking areas, for transferring a vehicle from a starting position to a target position.

In fully automatic (autonomous) "valet parking," a vehicle is parked by its driver at a dropoff point, for example in front of a parking garage, and from there the vehicle drives itself into a parking position/parking stall and back to the dropoff point.

SUMMARY

A need exists to expand or extend the concept of autonomous valet parking to further sectors. There is a need, for example, for the loading of vehicles into ships, onto trains, onto trucks, or into aircraft to be capable of being carried out autonomously.

A particular challenge for this application is that the internal digital parking maps of the ships, trains, trucks, or aircraft are different in terms of global coordinates at different loading points. This means that without further editing, such internal parking maps as a rule cannot be used for autonomous driving of a vehicle onto a ship, a train or a truck, or an aircraft.

An object of the invention is furnishing a concept on the basis of which efficient autonomous driving or loading of a vehicle on a transport vehicle is enabled.

One aspect of the present invention is directed to a method for editing a digital map of a transport vehicle for transporting vehicles, the map having one or more digital reference locations that are respectively associated with real reference locations of the transport vehicle, further digital locations of the digital map being derivable from the one or more digital reference locations, the further digital locations being respectively associated with further real locations of the transport vehicle, the method including: ascertaining respective reference coordinates of the one or more real reference locations of the transport vehicle relative to a reference coordinate system, so that the ascertained reference coordinates are associated with the corresponding digital reference locations; and deriving respective coordinates of the further digital locations of the digital map from the reference coordinates of the one or more reference locations based on a derivation protocol, so that coordinates relative to the reference coordinate system are respectively associated with the further digital locations of the digital map, so that an edited digital map of the transport vehicle is created, in which map coordinates relative to the reference coordinate system are associated with the digital locations.

A further aspect is directed to a method for creating a digital map of a transport vehicle for transporting vehicles, the method including: surveying the transport vehicle; creating the digital map based on the survey, in such a way that the digital map has one or more digital reference locations that are respectively associated with real reference locations of the transport vehicle; and ascertaining a derivation protocol based on which further digital locations of the digital map are derivable from the one or more digital reference locations, the further digital locations being respectively associated with real locations of the transport vehicle so that the digital map has one or more digital reference locations that are respectively associated with real reference locations of the transport vehicle, further digital locations of the digital map being derivable from the one or more digital reference locations by way of the derivation protocol, the further digital locations respectively being associated with further real locations of the transport vehicle.

Another aspect is directed to an apparatus for editing a digital map of a transport vehicle for transporting vehicles, the map having one or more digital reference locations that are respectively associated with real reference locations of the transport vehicle, further digital locations of the digital map being derivable from the one or more digital reference locations, the further digital locations being respectively associated with further real locations of the transport vehicle, the apparatus including: a surveying device for ascertaining respective reference coordinates of the one or more real reference locations of the transport vehicle relative to a reference coordinate system; and a processor that is embodied to associate the ascertained reference coordinates with the corresponding digital reference locations, the processor furthermore being embodied to derive respective coordinates of the further digital locations of the digital map from the reference coordinates of the one or more reference locations based on a derivation protocol, associate the further digital locations of the digital map respectively with coordinates relative to the reference coordinate system, and create an edited digital map of the transport vehicle in which coordinates relative to the reference coordinate system are associated with the digital locations.

Another aspect is directed to an apparatus for creating a digital map of a transport vehicle for transporting vehicles, the apparatus including: a surveying device for surveying the transport vehicle; and a processor for creating the digital map based on the survey, in such a way that the digital map has one or more digital reference locations that are respectively associated with real reference locations of the transport vehicle, the processor further being embodied to ascertain a derivation protocol based on which further digital locations of the digital map are derivable from the one or more digital reference locations, the further digital locations being respectively associated with real locations of the transport vehicle so that the digital map has one or more digital reference locations that are respectively associated with real reference locations of the transport vehicle, further digital locations of the digital map being derivable from the one or more digital reference locations by way of the derivation protocol, the further digital locations being respectively associated with further real locations of the transport vehicle.

Another aspect is directed to a loading system for loading vehicles onto or from a transport vehicle for transporting vehicles, the loading system encompassing a loading station and the apparatus for editing a digital map of a transport vehicle for transporting vehicles.

Another aspect is directed to a computer program, which program encompasses program code for carrying out the method for editing a digital map of a transport vehicle for transporting vehicles, and/or for creating a digital map of a transport vehicle for transporting vehicles, when the computer program is executed on a computer.

The invention thus encompasses, in particular and inter alia, the idea of providing a digital map that has one or more reference locations from which further locations of the digital map can be derived, i.e., are derivable, by way of a derivation protocol. In other words, the further digital locations of the digital map can be ascertained based on the reference locations and on the derivation protocol. Provision is made according to the present invention in particular that reference coordinates are associated with the real reference locations that correspond to the digital reference locations, those reference coordinates being ascertained relative to a reference coordinate system. This therefore means that the real reference locations are surveyed in order to ascertain respective reference coordinates relative to a reference coordinate system.

A derivation protocol as such, from a point in one coordinate system into another coordinate system or from a reference point to further digital locations of the digital map, is a mathematical translation. One skilled in the art knows how to ascertain and calculate derivation protocols as such. Examples may be found in the literature and therefore do not need to be repeated again here in detail.

According to an embodiment, the digital reference points and/or the derivation protocol become and/or are stored in the digital transport map and/or in a system of the transport vehicle and/or in a "cloud," i.e., a cloud infrastructure, that can be accessed, for example, by the ports etc.

The provision of a derivation protocol based on which the further digital locations of the digital map can be derived thus advantageously makes it possible also to allow the coordinates of the further digital locations relative to the reference coordinate system to be ascertained, in particular by the fact that the respective coordinates of the further digital locations of the digital map are derived from the reference coordinates based on the derivation protocol. This therefore means that given a knowledge of the reference coordinates and of the derivation protocol, the coordinates of the further digital locations relative to the reference coordinate system can be ascertained.

The result is therefore, advantageously, that an edited digital map is furnished, having locations with which coordinates relative to the reference coordinate system are associated. Because the coordinates of the real reference locations are ascertained relative to the reference coordinate system, the instantaneous position of the transport vehicle is advantageously taken into account. The correspondingly edited digital map can then, advantageously, be used efficiently and in simple fashion for autonomous driving or autonomous loading of a vehicle onto or within the transport vehicle.

It therefore advantageously becomes possible for the digital map to be reconciled, in accordance with the instantaneous position of the transport vehicle, depending on a position of the transport vehicle relative to the reference coordinate system. This therefore means that the digital map of the transport vehicle is recalibrated or aligned based on the instantaneous position of the transport vehicle relative to the reference coordinate system.

According to an embodiment, provision is made that the reference coordinate system is a global coordinate system. This brings about in particular a technical advantage that due to the use of the universally applicable global coordinate system, it is known where the further real locations of the transport vehicle are globally located. The coordinates of the further digital locations of the edited digital map are therefore coordinates of the global coordinate system. Because vehicles as a rule drive or navigate autonomously based on a global coordinate system, particularly efficient and improved navigation or autonomous driving of the vehicle on or within the transport vehicle and/or transport vehicles is thus enabled.

A reference coordinate system encompasses in particular the following indications: latitude and longitude.

According to an embodiment, provision is made that ascertainment and derivation are carried out when the transport vehicle is disposed at a loading station for loading vehicles. This therefore means that the transport vehicle is located at a loading station. The transport vehicle is thus, in particular, ready to load vehicles. Its position will thus, as a rule, not change further during loading, so that this is a useful point in time at which to calibrate the digital map of the transport vehicle with the instantaneous position of the transport vehicle at the loading station relative to the reference coordinate system. The further digital locations relative to the reference coordinate system are then made known to a vehicle that is waiting at the loading station to be loaded. Because the vehicle that is waiting at the loading station as a rule also plans or performs its autonomous driving relative to the reference coordinate system, efficient autonomous navigation or driving of the vehicle from the loading station to the transport vehicle and within the transport vehicle is thus advantageously made possible.

"Loading" for purposes of the present invention encompasses in particular unloading and/or loading of the transport vehicle with one or more vehicles.

In another embodiment, provision is made that a new digital map is created based on a digital loading station map, created relative to the reference coordinate system, of a loading station for loading vehicles, and on the edited digital map of the transport vehicle.

This therefore means in particular that an overall map is created which encompasses both the digital loading station map and the edited digital map of the transport vehicle. Efficient autonomous driving of the vehicle both within or on the loading station and on or within the transport vehicle is advantageously made possible based on this new digital map.

According to a further embodiment, provision is made that if the loading station map and the edited digital map have a different data format, one of the data formats is converted into the other data format prior to creation of the new digital map.

This brings about in particular the technical advantage that incompatibilities that can occur, for example, due to the differing data format can be avoided. This therefore means that the loading station map and the edited digital map have a uniform data format before the new digital map is created.

According to a further embodiment, provision is made that the further real locations correspond to parking spaces at which vehicles are intended to park for the purpose of transport.

This brings about in particular the technical advantage that the vehicles have knowledge regarding parking spaces relative to the reference coordinate system. This therefore means that the vehicles know the positions of the parking spaces relative to the reference coordinate system.

This advantageously makes it possible for the vehicles to drive autonomously to those parking spaces.

According to a further embodiment, provision is made that the transport vehicle is a waterborne vehicle, in particular a ship; a rail vehicle, in particular a train; an aerial vehicle, in particular an aircraft or a helicopter; or a land vehicle, in particular a truck.

In an embodiment, provision is made that the digital loading station map was created based on the reference coordinate system. This means that the loading station map encompasses digital locations that correspond to real locations of the loading station, coordinates relative to the reference coordinate system being associated with the digital locations.

According to an embodiment, provision is made that the apparatus for creating a digital map of a transport vehicle for transporting vehicles is configured or embodied to execute or carry out the method for creating a digital map of the transport vehicle for transporting vehicles.

According to a further embodiment, provision is made that the apparatus for editing a digital map of a transport vehicle for transporting vehicles is configured or embodied to execute or carry out the method for editing a digital map of a transport vehicle for transporting vehicles.

Apparatus features ensue analogously from corresponding method features, and vice versa. This therefore means that functionalities of the apparatus ensue from functionalities of the method, and vice versa.

The invention will be explained in further detail below with reference to preferred exemplifying embodiments.

DETAILED DESCRIPTION

Figure 1:
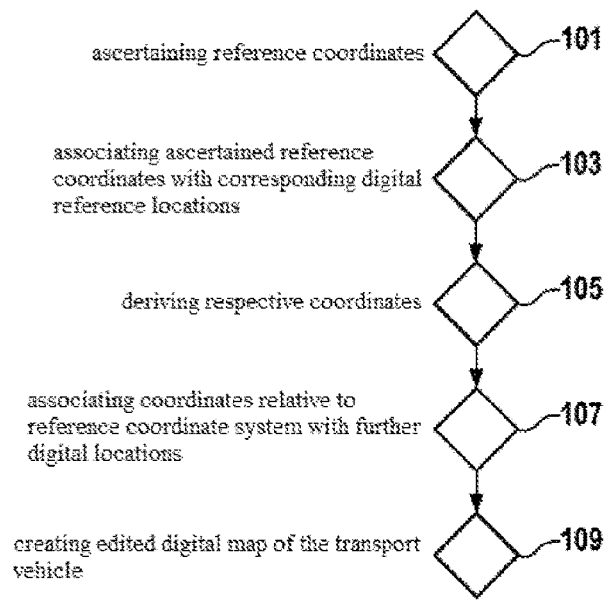
FIG. 1 is a flowchart of a method for editing a digital map of a transport vehicle according to an example embodiment of the present invention.

FIG. 1 is a flowchart of a method for editing a digital map of a transport vehicle for transporting vehicles, the map having one or more digital reference locations that are respectively associated with real reference locations of the transport vehicle, further digital locations of the digital map being derivable from the one or more digital reference locations, the further digital locations being respectively associated with further real locations of the transport vehicle, the method encompassing the following steps: ascertaining 101 respective reference coordinates of the one or more real reference locations of the transport vehicle relative to a reference coordinate system, so that the ascertained reference coordinates are associated 103 with the corresponding digital reference locations; and deriving 105 respective coordinates of the further digital locations of the digital map from the reference coordinates of the one or more reference locations based on a derivation protocol, so that coordinates relative to the reference coordinate system are respectively associated 107 with the further digital locations of the digital map, so that an edited digital map of the transport vehicle is created 109, in which map coordinates relative to the reference coordinate system are associated with the digital locations.

Figure 2:
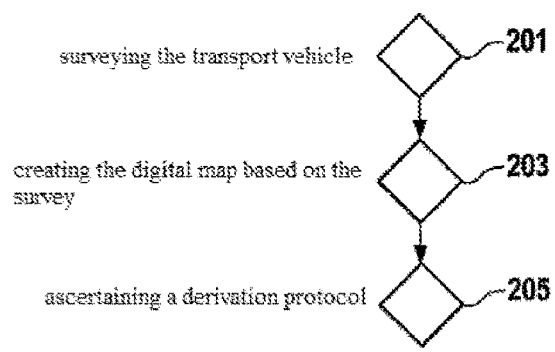
FIG. 2 is a flowchart of a method for creating a digital map of a transport vehicle according to an example embodiment of the present invention.

FIG. 2 is a flowchart of a method for creating a digital map of a transport vehicle for transporting vehicles, the method encompassing the following steps: surveying 201 the transport vehicle; creating 203 the digital map based on the survey, in such a way that the digital map has one or more digital reference locations that are respectively associated with real reference locations of the transport vehicle; and ascertaining 205 a derivation protocol based on which further digital locations of the digital map are derivable from the one or more digital reference locations, the further digital locations being respectively associated with real locations of the transport vehicle so that the digital map has one or more digital reference locations that are respectively associated with real reference locations of the transport vehicle, further digital locations of the digital map being derivable from the one or more digital reference locations by way of the derivation protocol, the further digital locations respectively being associated with further real locations of the transport vehicle.

Figure 3:
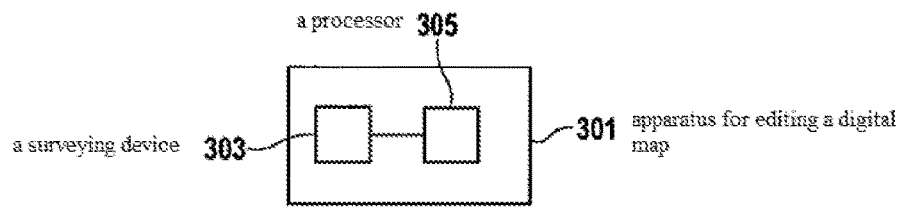
FIG. 3 shows an apparatus for editing a digital map of a transport vehicle according to an example embodiment of the present invention.

FIG. 3 shows an apparatus 301 for editing a digital map of a transport vehicle for transporting vehicles, the map having one or more digital reference locations that are respectively associated with real reference locations of the transport vehicle, further digital locations of the digital map being derivable from the one or more digital reference locations, the further digital locations being respectively associated with further real locations of the transport vehicle, the apparatus encompassing: a surveying device 303 for ascertaining respective reference coordinates of the one or more real reference locations of the transport vehicle relative to a reference coordinate system; and a processor 305 that is embodied to associate the ascertained reference coordinates with the corresponding digital reference locations, the processor furthermore being embodied to derive respective coordinates of the further digital locations of the digital map from the reference coordinates of the one or more reference locations based on a derivation protocol, associate the further digital locations of the digital map respectively with coordinates relative to the reference coordinate system, and create an edited digital map of the transport vehicle in which coordinates relative to the reference coordinate system are associated with the digital locations.

Figure 4:
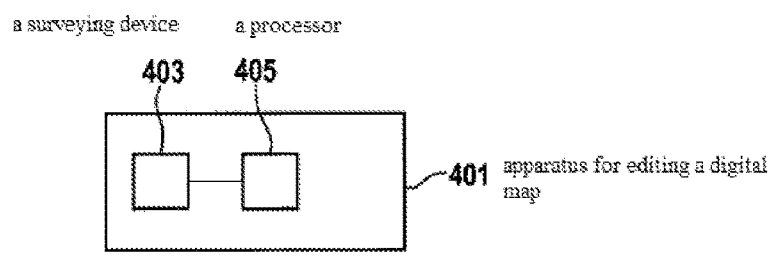
FIG. 4 shows an apparatus for creating a digital map of a transport vehicle according to an example embodiment of the present invention.

FIG. 4 shows an apparatus 401 for creating a digital map of a transport vehicle for transporting vehicles, the apparatus encompassing: a surveying device 403 for surveying the transport vehicle; and a processor 405 for creating the digital map based on the survey, in such a way that the digital map has one or more digital reference locations that are respectively associated with real reference locations of the transport vehicle, processor 405 further being embodied to ascertain a derivation protocol based on which further digital locations of the digital map are derivable from the one or more digital reference locations, the further digital locations being respectively associated with real locations of the transport vehicle so that the digital map has one or more digital reference locations that are respectively associated with real reference locations of the transport vehicle, further digital locations of the digital map being derivable from the one or more digital reference locations by way of the derivation protocol, the further digital locations being respectively associated with further real locations of the transport vehicle.

Figure 5:
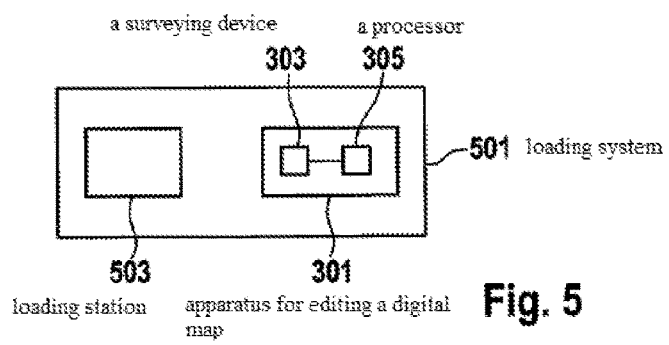
FIG. 5 shows a loading system according to an example embodiment of the present invention.

FIG. 5 shows a loading system 501 for loading vehicles onto or from a transport vehicle for transporting vehicles, loading system 501 encompassing a loading station 503 and apparatus 301 of FIG. 3.

Figure 6:
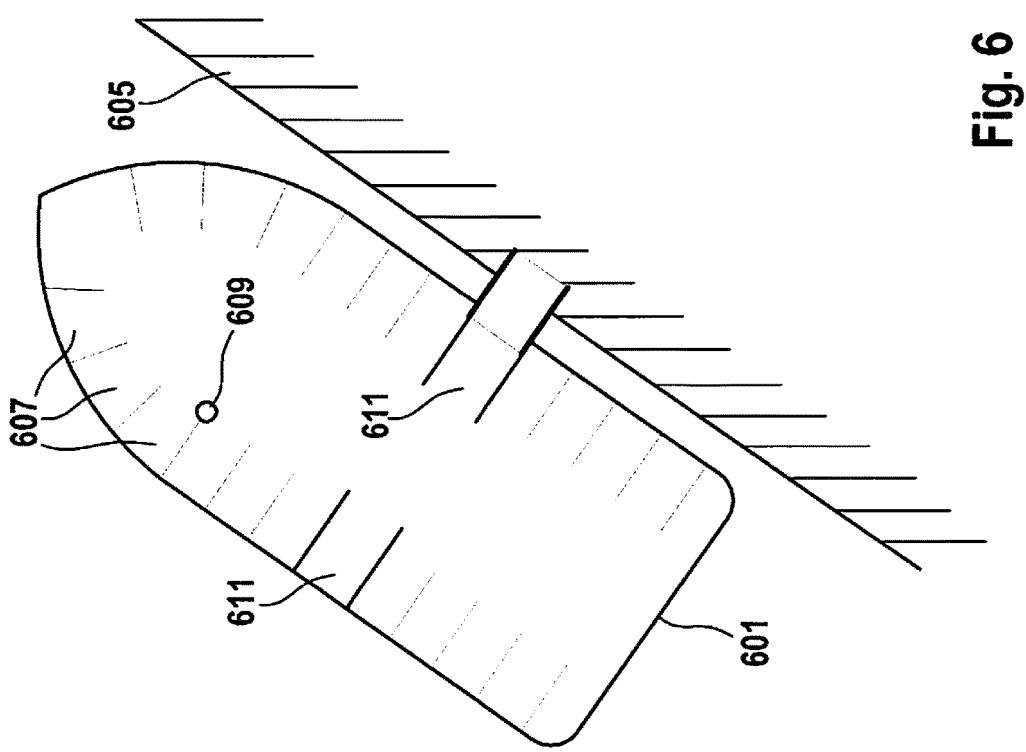
FIG. 6 shows a ship that is docked at two different ports according to an example embodiment of the present invention.
Figure 6:
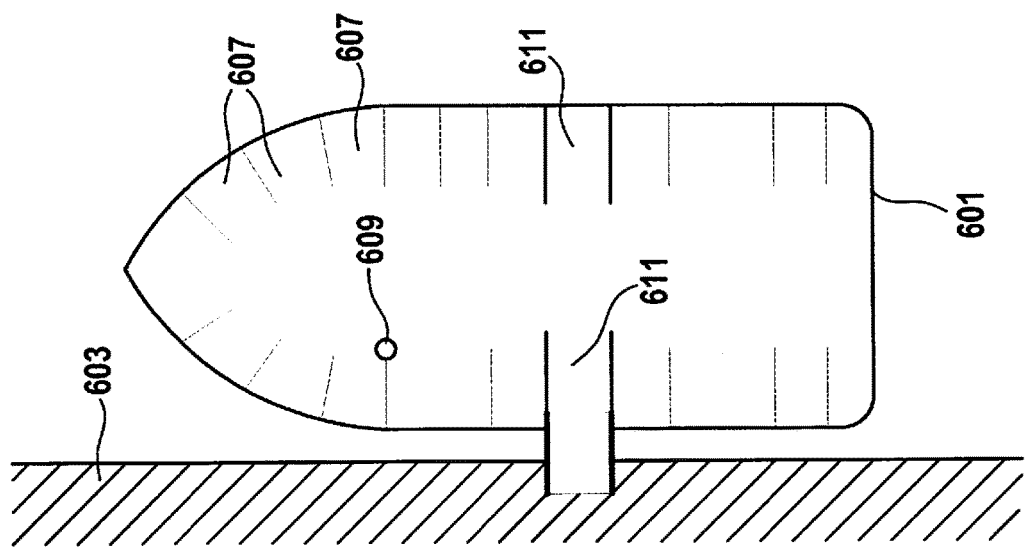

FIG. 6 schematically shows a ship 601 that is docked at a respective dock 603, 605 at two different ports. This therefore means that dock 603 belongs to one port. Dock 605 belongs to another port. The two ports are located geographically remotely from one another. For example, dock 603 is associated with the port in Antwerp. Dock 605 is associated, for example, with the port in New York.

Several parking spaces 607, in which vehicles can park, are schematically drawn on the ship.

Reference character 611 indicates ramps that can be used to load vehicles.

When a digital map of those parking spaces is then created, that internal digital map is different at the two docks 603, 605 in terms of a shared reference coordinate system, for example a global coordinate system. This is because ship 601 is in different positions. This therefore means that the position data of parking spaces 607 must be associated with coordinates relative to the shared reference coordinate system so that a vehicle can autonomously drive, based on the reference coordinate system, onto ship 601 to parking spaces 607. This association is effected in particular as follows.

The digital map of ship 601 has been created, each location or point within that map of ship 601 being derivable from one or more reference points or reference locations. One such exemplifying reference location is labeled here with the reference character 609.

This reference location 609 (the plural is also always to be understood) is then surveyed in terms of a reference coordinate system, for example in terms of the global coordinate system, at a specific loading station, i.e., when ship 601 is docked at one of docks 603, 605. The digital map of ship 601 can then be edited in such a way that coordinates relative to the reference coordinate system can be derived from the reference coordinates, so that parking spaces 607 have coordinates that have been ascertained relative to the reference coordinate system. The result is therefore, for example, that a loading-station-specific digital map has been calculated. This therefore means in particular that when ship 601 is docked, only reference location 609, or the reference locations, need to be surveyed in order to determine coordinates for the further locations (here, parking spaces 607) relative to the reference coordinate system. This considerably simplifies editing of the digital map.

Provision is then made in particular that a digital loading station map and the edited digital map are present; the edited digital map can also be referred to as a "transport vehicle map." The two maps exist in the same coordinate system, i.e., the reference coordinate system, for example the global coordinate system. Provision is made according to an embodiment that on the basis of these maps an overall map, i.e., a new digital map, is calculated or ascertained, based on which map, for example, an autonomously driving vehicle can independently or autonomously drive from a starting position, for example a parking position on the dock or in the loading station, to a target position, for example a parking position on ship 601, i.e., to a parking space 607.

According to an embodiment, the loading station map and the edited digital map have the same data format. This means that the format of the maps is the same in terms of a data format.

If this should happen not to be the case, according to an embodiment provision is made that a conversion from one format to the other format or closest format is carried out. This can be due to the fact, for example, that different suppliers are provided for the loading station map and for the edited digital map.

In summary, the invention furnishes a technical and efficient concept with which a map of a transport vehicle (for example, a ship or a train) can be converted into a loading station coordinate system, here the reference coordinate system; provision is made in particular that the map of the loading station and of the transport vehicle are combined into one shared map.

The foundation of the present invention is in particular that the map of the transport vehicle has been created, once, beforehand. Each point within that map of the transport vehicle is derivable from one or more reference points. That/those reference point(s) is/are then surveyed at the loading station in terms of the reference coordinate system, in particular in terms of the global coordinate system. A loading-station-specific transport vehicle map is then subsequently calculated. For this, all the points are derived on the basis of the reference point(s). This means that only one point, or a few points, in the loading station (the reference locations of the transport vehicle) are measured.

It is therefore advantageously made possible that once a digital map of the transport vehicle has been created, it can be used at different global positions at different loading stations.

What is claimed is:

1. A method for editing a digital map of a transport vehicle for transporting vehicles, the method comprising:

for each of one or more real reference locations of the transport vehicle that corresponds to a respective digital reference location of the map, ascertaining respective reference coordinates relative to a reference coordinate system, so that the respective ascertained reference coordinates are associated with the respective digital reference location that corresponds to the respective real reference location; and deriving respective coordinates, relative to the reference coordinate system, of further digital locations of the digital map from the reference coordinates of the one or more real reference locations based on a derivation protocol, wherein the further digital locations corresponding to further real locations of the transport vehicle, the digital map of the transport vehicle thereby being edited to include the map coordinates, relative to the reference coordinate system, that are associated with the one or more real reference locations and with the further real locations of the transport vehicle.

2. The method of claim 1, wherein the reference coordinate system is a global coordinate system.

3. The method of claim 1, wherein the ascertainment and derivation are carried out when the transport vehicle is disposed at a loading station for loading vehicles.

4. The method of claim 1, wherein a new digital map is created based on a digital loading station map, created relative to the reference coordinate system, of a loading station for loading vehicles, and on the edited digital map of the transport vehicle.

5. The method of claim 4, wherein, if the loading station map and the edited digital map have a different data format, one of the data formats is converted into the other data format prior to creation of the new digital map.

6. The method of claim 1, wherein the further real locations correspond to parking spaces at which vehicles are intended to park for transport.

7. The method of claim 1, wherein the transport vehicle is one of a waterborne vehicle, a rail vehicle, an aerial vehicle, and a land vehicle.

8. A method, the method comprising:
surveying a transport vehicle that transports vehicles;
creating a digital map based on the survey, wherein the created digital map includes one or more digital reference locations that are each associated with a respective real location of the transport vehicle;
ascertaining a derivation protocol; and
using the derivation protocol to derive from the one or more digital reference locations further digital locations of the digital map, the further digital locations being respectively associated with further real locations of the transport vehicle so that the digital map includes the one or more digital reference locations that are respectively associated with the real locations of the transport vehicle and includes the further digital locations.

9. An apparatus comprising:
a surveying device; and
a processor;
wherein:
the surveying device is configured to ascertain, for each of one or more real reference locations of a transport vehicle that transports vehicles, respective reference coordinates relative to a reference coordinate system; and
the processor is configured to:
associate the ascertained reference coordinates with corresponding digital reference locations of a digital map;
use a derivation protocol to derive, from the reference coordinates of the one or more real reference locations, respective coordinates, relative to the reference coordinate system, of further real reference locations;
associate the derived coordinates with further digital locations of the digital map; and
create an edited version of the digital map in which coordinates, relative to the reference coordinate system, are associated with the digital locations and the further digital locations.

10. An apparatus for creating a digital map of a transport vehicle for transporting vehicles, the apparatus comprising:
a surveying device; and
a processor;
wherein:
the surveying device is configured to survey the transport vehicle; and
the processor is configured to:
create the digital map based on the survey, in such a way that the digital map includes one or more digital reference locations that are each associated with a respective real location of the transport vehicle;
ascertain a derivation protocol; and
use the derivation protocol to derive from the one or more digital reference locations further digital locations of the digital map, the further digital locations being respectively associated with further real locations of the transport vehicle so that the digital map includes the one or more digital reference locations that are respectively associated with the real locations of the transport vehicle and includes the further digital locations.

11. A loading system for loading vehicles onto or from a transport vehicle, the loading system comprising:
a loading station; and
an apparatus that includes a surveying device and a processor;
wherein:
the surveying device is configured to ascertain, for each of one or more real reference locations of a transport vehicle that transports vehicles, respective reference coordinates relative to a reference coordinate system; and
the processor is configured to:
associate the ascertained reference coordinates with corresponding digital reference locations of a digital map;
use a derivation protocol to derive, from the reference coordinates of the one or more real reference locations, respective coordinates, relative to the reference coordinate system, of further real reference locations;
associate the derived coordinates with further digital locations of the digital map; and
create an edited version of the digital map in which coordinates, relative to the reference coordinate system, are associated with the digital locations and the further digital locations.

12. A non-transitory computer-readable medium on which are stored instructions that are executable by a processor and that, when executed by the processor, causes the processor to perform a method for editing a digital map of a transport vehicle for transporting vehicles, the method comprising:
for each of one or more real reference locations of the transport vehicle that corresponds to a respective digital reference location of the map, ascertaining respective reference coordinates relative to a reference coordinate system, so that the respective ascertained reference coordinates are associated with the respective digital reference location that corresponds to the respective real reference location; and
deriving respective coordinates, relative to the reference coordinate system, of further digital locations of the digital map from the reference coordinates of the one or more real reference locations based on a derivation protocol, wherein the further digital locations corresponding to further real locations of the transport vehicle, the digital map of the transport vehicle thereby being edited to include the map coordinates, relative to the reference coordinate system, that are associated with the one or more real reference locations and with the further real locations of the transport vehicle.

* * * * *